(12) United States Patent
Avar et al.

(10) Patent No.: US 11,089,840 B2
(45) Date of Patent: *Aug. 17, 2021

(54) ARTICLE OF FOOTWEAR HAVING A POLYGON LUG SOLE PATTERN

(71) Applicant: NIKE, INC., Beaverton, OR (US)

(72) Inventors: Eric P. Avar, Lake Oswego, OR (US); Kevin W. Hoffer, Portland, OR (US); Tobie D. Hatfield, Lake Oswego, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/404,222

(22) Filed: May 6, 2019

(65) Prior Publication Data

US 2019/0328087 A1 Oct. 31, 2019

Related U.S. Application Data

(63) Continuation of application No. 14/459,689, filed on Aug. 14, 2014, now Pat. No. 10,278,456, which is a
(Continued)

(51) Int. Cl.
*A43B 13/22* (2006.01)
*A43D 86/00* (2006.01)
(Continued)

(52) U.S. Cl.
CPC ............ *A43D 86/00* (2013.01); *A43B 1/0009* (2013.01); *A43B 13/141* (2013.01); *A43B 13/16* (2013.01);
(Continued)

(58) Field of Classification Search
CPC .............................. A43B 23/223; A43B 23/26
(Continued)

(56) References Cited

U.S. PATENT DOCUMENTS

| 500,386 A | 6/1893 | Hall |
| 1,594,056 A | 7/1926 | Floyd |

(Continued)

FOREIGN PATENT DOCUMENTS

| AU | 607634 B2 | 3/1991 |
| CN | 201270830 Y | 7/2009 |

(Continued)

OTHER PUBLICATIONS

Translation of DE3521141, Inventor:Robert Vogler, Adidas, publ:Aug. 21, 1986.*
(Continued)

*Primary Examiner* — Ted Kavanaugh
(74) *Attorney, Agent, or Firm* — Banner & Witcoff, Ltd.

(57) ABSTRACT

Articles of footwear, including athletic footwear, include one or more of: (a) an upper; (b) a sole structure including a midsole and an outsole, the outsole having a plurality of polygonal lugs arranged about a base surface of the outsole. The outsole may include one or more regions wherein the characteristics of a portion of the lugs within a region differ from the characteristics of a portion of the lugs in another region. The lugs may differ, for example based on size, construction and/or spacing between the lugs. Methods of manufacturing such articles of footwear also are disclosed.

8 Claims, 8 Drawing Sheets

Related U.S. Application Data continuation of application No. 13/456,612, filed on Apr. 26, 2012, now Pat. No. 8,832,970, which is a continuation of application No. 12/039,072, filed on Feb. 28, 2008, now Pat. No. 8,186,078.

(60) Provisional application No. 60/892,129, filed on Feb. 28, 2007.

(51) Int. Cl.

| | | |
|---|---|---|
| *A43B 1/00* | (2006.01) | |
| *A43B 13/14* | (2006.01) | |
| *A43B 13/16* | (2006.01) | |
| *A43B 13/18* | (2006.01) | |
| *A43B 13/26* | (2006.01) | |
| *B29D 35/12* | (2010.01) | |
| *B29D 35/06* | (2010.01) | |

(52) U.S. Cl.
CPC .......... *A43B 13/184* (2013.01); *A43B 13/186* (2013.01); *A43B 13/223* (2013.01); *A43B 13/26* (2013.01); *B29D 35/06* (2013.01); *B29D 35/122* (2013.01)

(58) Field of Classification Search
USPC .......................... 36/59 R, 59 C; D2/957, 958
See application file for complete search history.

(56) References Cited

U.S. PATENT DOCUMENTS

| | | | |
|---|---|---|---|
| 2,553,616 A * | 5/1951 | Walls | A43B 13/20 36/29 |
| 2,627,676 A * | 2/1953 | Hack | A43B 13/184 36/29 |
| 3,306,964 A | 2/1967 | Miller | |
| 3,793,750 A * | 2/1974 | Bowerman | A43B 13/223 36/59 C |
| 4,098,011 A | 7/1978 | Bowerman et al. | |
| D248,897 S | 8/1978 | Toothaker | |
| 4,107,858 A | 8/1978 | Bowerman et al. | |
| 4,194,310 A * | 3/1980 | Bowerman | A43B 5/00 36/128 |
| 4,241,524 A | 12/1980 | Sink | |
| 4,309,831 A | 1/1982 | Pritt | |
| 4,316,335 A | 2/1982 | Giese et al. | |
| D264,268 S | 5/1982 | Askew | |
| 4,327,503 A | 5/1982 | Johnson | |
| 4,377,041 A * | 3/1983 | Alchermes | A43B 13/12 36/30 R |
| 4,378,643 A | 4/1983 | Johnson | |
| 4,439,936 A | 4/1984 | Clarke et al. | |
| D281,462 S | 11/1985 | Pope | |
| 4,562,651 A | 1/1986 | Frederick et al. | |
| 4,641,438 A | 2/1987 | Laird et al. | |
| 4,642,917 A | 2/1987 | Ungar | |
| 5,035,068 A | 7/1991 | Biasi | |
| 5,048,203 A | 9/1991 | Kling | |
| 5,375,346 A | 12/1994 | Cole et al. | |
| 5,384,973 A | 1/1995 | Lyden | |
| D356,885 S | 4/1995 | Poole, Jr. | |
| D359,385 S | 6/1995 | Meraw | |
| D378,472 S | 3/1997 | Bramani | |
| 5,775,005 A | 7/1998 | McClelland | |
| D421,832 S | 3/2000 | Loveder | |
| 6,065,230 A | 5/2000 | James | |
| 6,115,945 A | 9/2000 | Ellis, III | |
| 6,178,662 B1 | 1/2001 | Legatzke | |
| 6,230,501 B1 | 5/2001 | Bailey, Sr. et al. | |
| D444,293 S | 7/2001 | Turner et al. | |
| 6,321,468 B1 | 11/2001 | DeGrand et al. | |
| 6,519,797 B1 | 2/2003 | Brubaker et al. | |
| D470,999 S | 3/2003 | Schroeder et al. | |
| 6,915,594 B2 | 7/2005 | Kim | |
| D512,821 S | 12/2005 | Lee | |
| 6,990,755 B2 | 1/2006 | Hatfield et al. | |
| 7,290,357 B2 | 11/2007 | McDonald et al. | |
| D564,191 S | 3/2008 | Jensen | |
| 8,186,078 B2 * | 5/2012 | Avar | A43B 13/223 36/59 R |
| D714,039 S | 9/2014 | Miner | |
| 8,832,970 B2 * | 9/2014 | Avar | A43B 13/186 36/59 R |
| D738,601 S | 9/2015 | Hubner | |
| 10,238,170 B2 * | 3/2019 | Avar | A43B 13/184 |
| 2003/0009912 A1 | 1/2003 | Stubblefield et al. | |
| 2004/0046274 A1 | 3/2004 | Wu | |
| 2005/0076536 A1 | 4/2005 | Hatfield et al. | |
| 2005/0188562 A1 | 9/2005 | Clarke et al. | |
| 2006/0156579 A1 | 7/2006 | Hoffer et al. | |
| 2008/0307679 A1 | 12/2008 | Chiang et al. | |

FOREIGN PATENT DOCUMENTS

| | | |
|---|---|---|
| DE | 1202976 | 10/1965 |
| DE | 1714335 U1 | 9/1977 |
| DE | 3521141 A1 | 8/1986 |
| FR | 2261721 A1 | 9/1975 |
| GB | 2068707 A | 8/1981 |
| GB | 2223394 A | 4/1990 |
| JP | 101310601 A | 12/1989 |

OTHER PUBLICATIONS

Sep. 29, 2008—(WO) International Search Report—App. PCT/US2008/054965.
Sep. 29, 2008—(WO) Written Opinion—App. PCT/US2008/054965.
Nov. 6, 2013—(EP) Extended Search Report—App. 13183551.4.
Nov. 8, 2013—(EP) Office Action—Apr 08730715.3.
Nov. 6, 2013—(EP) Extended Search Report—App. 13183552.2.
Dec. 28, 2016—U.S. Office Action—U.S. Appl. No. 14/459,689.
Jun. 26, 2016—(EP) Office Action—Apr 13183552.2.
Jul. 10, 2017—U.S. Office Action—U.S. Appl. No. 14/459,689.
May 8, 2017—(EP) Office Action—Apr 13183552.2.
May 16, 2017—U.S. Office Action—U.S. Appl. No. 14/980,647.
Jan. 22, 2018—U.S. Office Action—U.S. Appl. No. 14/459,689.
Jul. 3, 2018—U.S. Office Action—U.S. Appl. No. 14/459,689.
Jun. 6, 2018—U.S. Office Action—U.S. Appl. No. 14/980,647.
International Preliminary Exam Report dated Sep. 11, 2009 in PCT Application No. PCT/US2008/054965.
Office Action dated Oct. 20, 2011 in European Patent Application No. 08 730 715.3.
Office Action dated Feb. 28, 2011 in Chinese Patent Application 200810006527.X.
Mar. 29, 2019—(EP) ESR—App. 18211880.2.

* cited by examiner

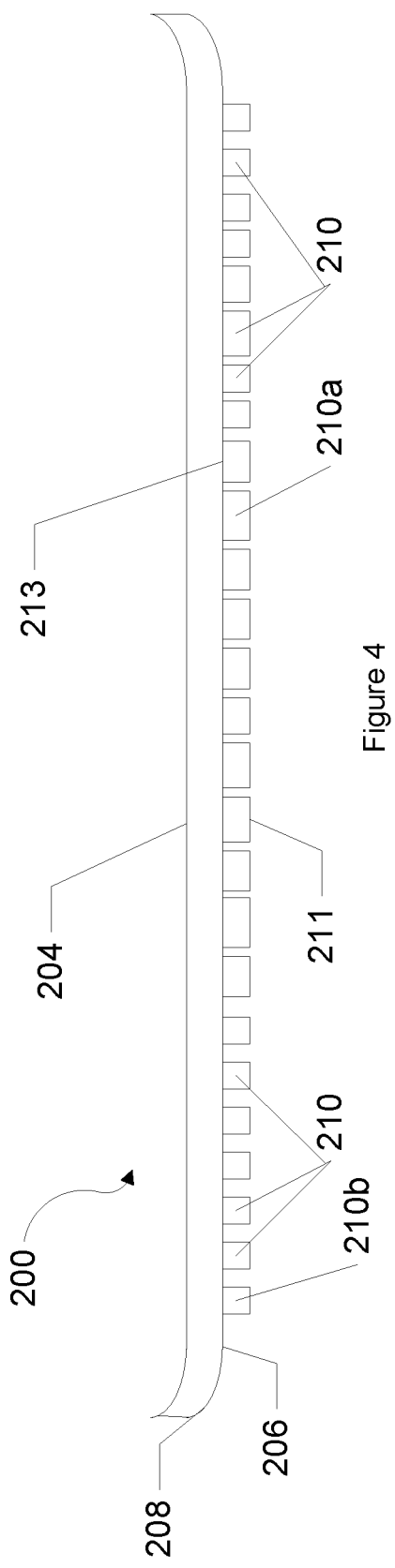
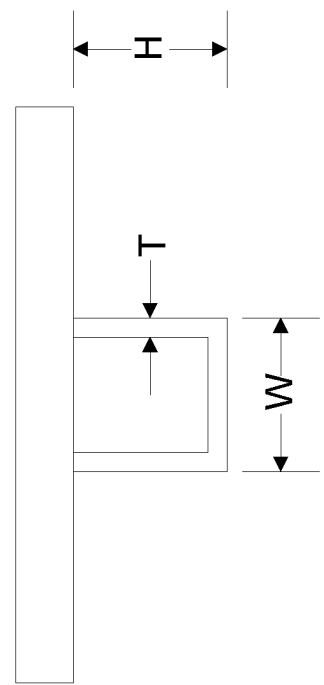
Figure 4
Figure 5

ARTICLE OF FOOTWEAR HAVING A POLYGON LUG SOLE PATTERN

CROSS REFERENCE TO RELATED APPLICATIONS

This application is a continuation of U.S. patent application Ser. No. 14/459,689 filed Aug. 14, 2014, which is a continuation of U.S. patent application Ser. No. 13/456,612 filed Apr. 26, 2012 (now U.S. Pat. No. 8,832,970), which is a continuation of U.S. patent application Ser. No. 12/039,072, filed Feb. 28, 2008 (now U.S. Pat. No. 8,186,078), which application claims the benefit of U.S. Provisional Application No. 60/892,129, entitled "Article of Footwear Having a Polygon Lug Sole Pattern," filed on Feb. 28, 2007, which said applications are incorporated herein by reference in their entireties.

TECHNICAL FIELD

Aspects of the invention relate to articles of footwear. More specifically, aspects of the invention relate to articles of footwear having a sole structure with polygonal protrusions extending downward forming a ground contacting surface.

BACKGROUND

Conventional articles of athletic footwear generally include two primary elements, an upper and a sole structure. The upper is secured to the sole structure and forms a void on the interior of the footwear for comfortably and securely receiving a foot. The upper, in at least some footwear structures, generally extends over the instep and toe areas of the foot, along the medial and lateral sides of the foot, and around the heel area of the foot. In some articles of footwear, such as basketball footwear and boots, the upper may extend upward and around the ankle to provide support for the ankle. Access to the void in the interior of the footwear is generally provided by an access opening. A lacing or other footwear securing system often is incorporated into the upper to selectively increase the size of the access opening and to permit the wearer to modify certain dimensions of the upper, particularly girth, to accommodate feet with varying dimensions and to allow for easy foot insertion and removal. In addition, the upper further may include a tongue that extends under the lacing system to enhance comfort of the footwear and a heel counter to limit movement of the heel.

Various materials are conventionally utilized in manufacturing uppers. The upper of athletic footwear, for example, may be formed from multiple material layers that include an exterior layer, an intermediate layer, and an interior layer. The materials forming the exterior layer of the upper may be selected based upon the properties of wear-resistance, flexibility, and air-permeability, for example. With regard to the exterior layer, the toe area and the heel area may be formed of leather, synthetic leather, or a rubber material to impart a relatively high degree of wear-resistance. Leather, synthetic leather, and rubber materials, however, may not exhibit the desired degree of flexibility and air-permeability for various other areas of the exterior layer of the upper. Accordingly, the other areas of the exterior layer may be formed from a synthetic textile, for example. The exterior layer of the upper may be formed, therefore, from numerous material elements that each imparts different properties to the upper. The intermediate layer of the upper is conventionally formed from a lightweight polymer foam material that provides impact force attenuation and enhances comfort. Similarly, the interior layer of the upper may be formed of a comfortable and moisture-wicking textile that removes perspiration from the area immediately surrounding the foot. In some articles of athletic footwear, the various layers may be joined with an adhesive, and stitching may be utilized to join elements within a single layer or to reinforce specific areas of the upper.

The sole structure is positioned between the upper and the ground, and it may include a polymer foam midsole and an outsole. The midsole is arranged between the upper and the outsole and attenuates ground (or other contact surface) reaction forces to lessen stresses upon the foot and leg. The outsole forms a ground-engaging portion (or other contact surface-engaging portion) of the sole structure and is formed from a durable and wear-resistant material. The outsole is generally connected to a bottom surface of the midsole and provides cushioning and traction to the wearer. The sole is formed of a flexible material to allow the article of footwear to flex with the motion of the foot. The sole structure also may include a sockliner or an insole member that is positioned within the void and proximal a lower surface of the foot to enhance footwear comfort.

SUMMARY

One aspect of the invention relates to articles of footwear having an upper and a sole structure. The sole structure includes a midsole connected to the upper and an outsole having a base surface engaged with the midsole and a plurality of lugs protruding generally perpendicularly therefrom. The lugs may be polygonal in shape and may have a uniform shape from a distal end to a proximal end. The lugs may be arranged such that they are not in contact with each other, at least at their distal ends. Some examples of different shapes that may be used for the polygonal lugs are hexagonal, pentagonal, octagonal, and triangular.

Additional aspects of this invention relate to articles of footwear, including athletic footwear or other types of footwear. Articles of footwear in accordance with at least some examples of this invention may include one or more of: (a) an upper; and (b) a sole structure connected to the upper, the sole structure including a midsole and an outsole. In some arrangements the outsole includes a plurality of polygonal lugs protruding downward from a bottom surface of the outsole. The plurality of polygonal lugs may have a uniform shape. The outsole may also include one or more regions wherein the characteristics of the lugs in a first region may differ from the characteristics of the lugs in other regions. Some examples of characteristics that may differ between lugs of various regions include: (a) width; (b) wall thickness; and (c) spacing between the lugs.

Further aspects of this invention relate to methods of manufacturing articles of footwear, e.g., of the various types described above. Such methods may include, for example: (a) forming a mold of an outsole defining a base surface and including openings corresponding to a plurality of polygonal lugs; (b) filling the mold with polyurethane or other desired material; (c) removing excess polyurethane or other material; (d) adding textile or leather (or other desired material) to the mold; and (e) applying heat and/or pressure to form the final molded product. One or more additional elements, structures, and/or features, may be incorporated into the overall footwear structure and/or footwear production method without departing from this invention.

The advantages and features of novelty characterizing various aspects of the invention are pointed out with particularity in the appended claims. To gain an improved understanding of the advantages and features of novelty, however, reference may be made to the following descriptive matter and the accompanying drawings that describe and illustrate various embodiments and concepts related to the aspects of the invention.

DESCRIPTION OF THE DRAWINGS

The foregoing Summary, as well as the following Detailed Description, will be better understood when read in conjunction with the accompanying drawings.

FIG. 4 is a cross-sectional view of the example outsole shown in FIG. 3 taken along line A-A.

FIG. 5 is a cross-sectional view of one example polygonal lug of the outsole shown in FIG. 3 illustrating various dimensions of the lug.

DETAILED DESCRIPTION

Figure 1:
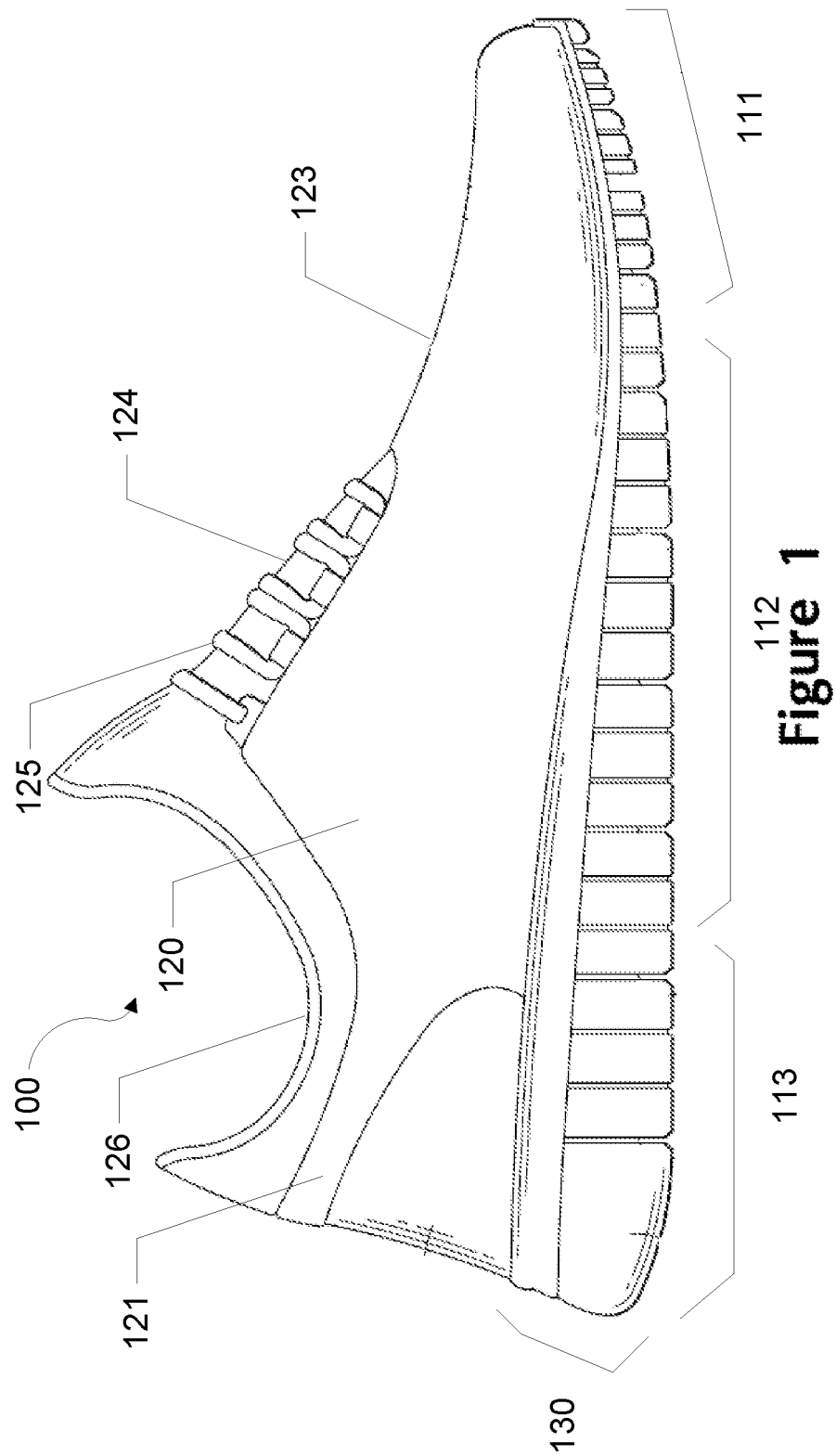
FIG. 1 is a lateral side elevational view of an example article of footwear having an outsole in accordance with aspects of the invention.

The following discussion and accompanying figures disclose various articles of footwear having uppers with a polygonal lug pattern in the outsole in accordance with examples and aspects of the present invention. Concepts related to the polygonal lug sole pattern are disclosed with reference to various articles of athletic footwear having configurations suitable, for example, for sports such as running, walking, and the like. The polygonal lug sole structure, however, is not solely limited to footwear designed for these activities. Rather, they may be incorporated into a wide range of athletic footwear styles, including shoes that are suitable for basketball, baseball, cross-training, football, rugby, soccer, tennis, and volleyball, for example. In addition, the polygonal lug sole structure may be incorporated into footwear that is generally considered to be non-athletic, including a variety of casual shoes, sandals, boots, shower shoes, beach/water shoes, shoes for water sports and/or for use in wet conditions, etc. An individual skilled in the relevant art will appreciate, therefore, that the concepts disclosed herein with regard to the polygonal lug sole structure may be applied to a wide variety of footwear styles, in addition to the specific styles discussed in the following material and depicted in the accompanying figures.

I. General Description of Aspects of this Invention

1. Articles of Footwear

Aspects of this invention relate to articles of footwear, including athletic footwear or other types of footwear, that include: (a) an upper forming a void for receiving a foot; (b) a sole structure having a midsole connected to an upper and an outsole, the outsole including a plurality of polygonal lugs; and (c) one or more regions within the outsole that include lugs having varying size and performance characteristics. Further aspects of the invention relate to methods of manufacturing articles of footwear according to the structural aspects described.

Articles of footwear in accordance with at least some examples of the invention may include additional or alternative features. For example, in some structures, the outsole may be connected to a midsole having a plurality of incisions or sipes formed in the sidewall of the midsole.

The polygonal lugs, when present, may take on a variety of forms without departing from this invention. For example, in some structures, the polygonal lugs may comprise various shapes. For instance, the polygonal lugs may be formed as (a) hexagonal; (b) pentagonal; (c) octagonal; and (d) triangular. The lugs may also be formed in various sizes and may be formed with differing wall thicknesses to provide additional support in various regions of the outsole. The polygonal lugs may also be formed in various configurations, including (a) uniform; (b) stepped; and (c) tapered configurations.

Articles of footwear in accordance with at least some aspects of the invention may include an outsole having one or more regions. The regions may be identified based on characteristics of at least a portion of the lugs within a region. In some examples, the size and/or configuration of the lugs within a region may be different from the sizes and/or configurations of the lugs in another region. In addition, the lugs in a given region may be spaced more or less closely than the lugs in other regions.

Articles of footwear in accordance with at least some aspects of the invention may include some or all of the above described features, alone or in combination. Articles of footwear in accordance with the invention also may have additional features described herein that may be used in combination with the features described above.

2. Methods of Constructing Articles of Footwear

Further aspects of this invention relate to methods of manufacturing articles of footwear, e.g., of the various types described above. Such methods may include, for example: (a) forming a mold of an outsole defining a base surface and including a plurality of open spaces corresponding to plural polygonal lugs; (b) filling the mold with polyurethane (or other desired material); (c) removing excess polyurethane (or other desired material); (d) adding textile or leather (or other desired material) to the mold and (e) applying heat and/or pressure to form the final molded product.

Methods in accordance with examples of this invention may include additional steps, the above-noted steps may be changed in order, and/or various steps may be omitted or modified, without departing from this invention.

II. Detailed Description of Example Structures and Methods According to the Invention Specific examples of structures and methods according to the invention are described in more detail below. The reader should understand that these specific examples are set forth merely to illustrate examples of the invention, and they should not be construed as limiting the invention.

Figure 2:
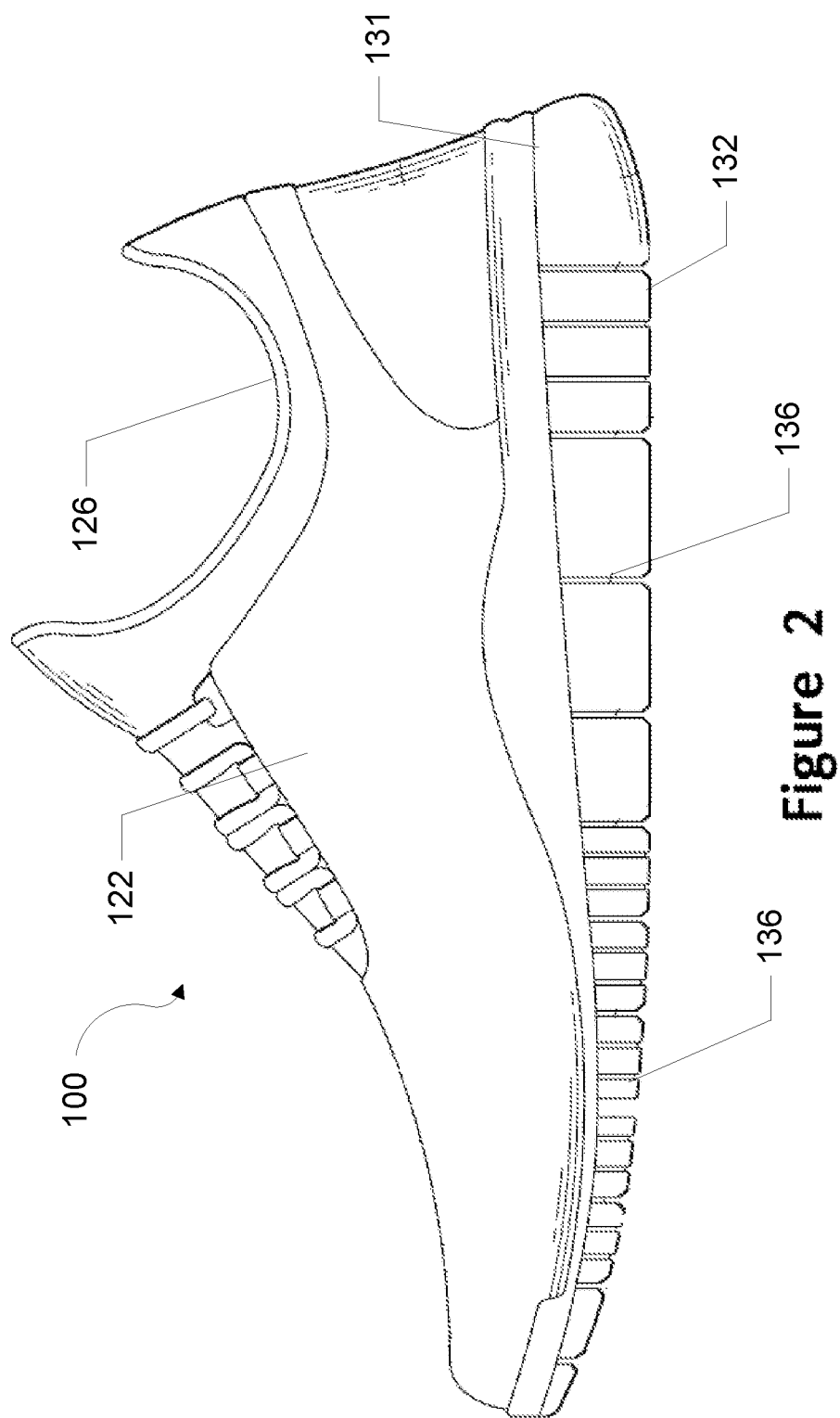
FIG. 2 is a medial side elevational view of this example article of footwear.

An article of footwear 100 is depicted in FIGS. 1-2 as including an upper 120 and a sole structure 130. For purposes of reference in the following description, footwear 100 may be divided into three general regions: a forefoot region 111, a midfoot region 112, and a heel region 113, as illustrated in FIG. 1. Regions 111-113 are not intended to demarcate precise areas of footwear 100. Rather, regions 111-113 are intended to represent general areas of footwear 100 that provide a frame of reference during the following discussion. Although regions 111-113 apply generally to footwear 100, references to regions 111-113 also may apply specifically to upper 120, sole structure 130, or individual components included within and/or formed as part of either upper 120 or sole structure 130.

Upper 120 is secured to sole structure 130 and defines a void or chamber for receiving a foot. For purposes of reference, upper 120 includes a lateral side 121, an opposite medial side 122, and a vamp or instep area 123. Lateral side 121 is positioned to extend along a lateral side of the foot (i.e., the outside) and generally passes through each of regions 111-113. Similarly, medial side 122 is positioned to extend along an opposite medial side of the foot (i.e., the inside) and generally passes through each of regions 111-113. Vamp area 123 is positioned between lateral side 121 and medial side 122 to correspond with an upper surface or instep area of the foot. Vamp area 123, in this illustrated example, includes a throat 124 having a lace 125 or other desired closure mechanism that is utilized in a conventional manner to modify the dimensions of upper 120 relative to the foot, thereby adjusting the fit of footwear 100. Upper 120 also includes an ankle opening 126 that provides the foot with access to the void within upper 120. A variety of materials may be used for constructing upper 120, including materials that are conventionally utilized in footwear uppers. Accordingly, upper 120 may be formed from one or more portions of leather, synthetic leather, natural or synthetic textiles, polymer sheets, polymer foams, mesh textiles, felts, non-woven polymers, or rubber materials, for example. The upper 120 may be formed from one or more of these materials wherein the materials or portions thereof are stitched or adhesively bonded together, e.g., in manners that are conventionally known and used in the art.

Upper 120 may also include a heel element (not shown) and a toe element (not shown). The heel element, when present, may extend upward and along the interior surface of upper 120 in the heel region 113 to enhance the comfort of footwear 100. The toe element, when present, may be located in forefoot region 111 and on an exterior surface of upper 120 to provide wear-resistance, protect the wearer's toes, and assist with positioning of the foot. In some embodiments, one or both of the heel element and the toe element may be absent, or the heel element may be positioned on an exterior surface of the upper 120, for example. Although the configuration of upper 120 discussed above is suitable for footwear 100, upper 120 may exhibit the configuration of any desired conventional or non-conventional upper structure without departing from this invention.

Sole structure 130 is secured to a lower surface of upper 120 and may have a generally conventional shape. The sole structure 130 may have a multipiece structure, e.g., one that includes a midsole 131, an outsole 132, and a sockliner or insole member (not shown). Midsole 131 may be formed of polymer foam material, such as polyurethane, ethylvinylacetate, or other materials (such as phylon, phylite, etc.) that compress to attenuate ground or other contact surface reaction forces during walking, running, jumping, or other activities. In some example structures according to this invention, the polymer foam material may encapsulate or include various elements, such as a fluid-filled bladder or moderator, that enhance the comfort, motion-control, stability, and/or ground or other contact surface reaction force attenuation properties of footwear 100. In still other example structures, the midsole 131 may include additional elements that compress to attenuate ground or other contact surface reaction forces. For instance, the midsole may include column type elements to aid in cushioning and absorption of forces.

Outsole 132 is secured to a lower surface of midsole 131 in this illustrated example footwear structure 100 and is formed of a wear-resistant material, such as rubber or a flexible synthetic material, such as polyurethane, that contacts the ground or other surface during ambulatory or other activities. The material forming outsole 132 may be manufactured of suitable materials and/or textured to impart enhanced traction and slip resistance. The structure and methods of manufacturing the outsole 132 will be discussed further below. An insole or sockliner is a thin, compressible member that may be located within the void in upper 120 and adjacent to a lower surface of the foot (or between the upper 120 and midsole 131) to enhance the comfort of footwear 100. In some arrangements, the insole or sockliner may be absent.

The outsole 132 shown in FIGS. 1 and 2 includes a plurality of incisions or sipes 136 in either or both sides of the outsole 132. These sipes 136 may extend from the bottom of the outsole 132 to an upper portion thereof or to the midsole 131. In one arrangement, the sipes 136 may extend from a bottom surface of the outsole 132 to a point halfway between the bottom of the outsole 132 and the top of the outsole 132. In another arrangement, the sipes 136 may extend from the bottom of the outsole 132 to a point greater than halfway to the top of the outsole 132. In yet another arrangement, the sipes 136 may extend from the bottom of the outsole 132 to a point where the outsole 132 meets the midsole 131. The sipes 136 may provide additional flexibility to the outsole 132, and thereby allow the outsole to more freely flex in the natural directions in which the wearer's foot flexes. In addition, the sipes 136 may aid in providing traction for the wearer.

Figure 3:
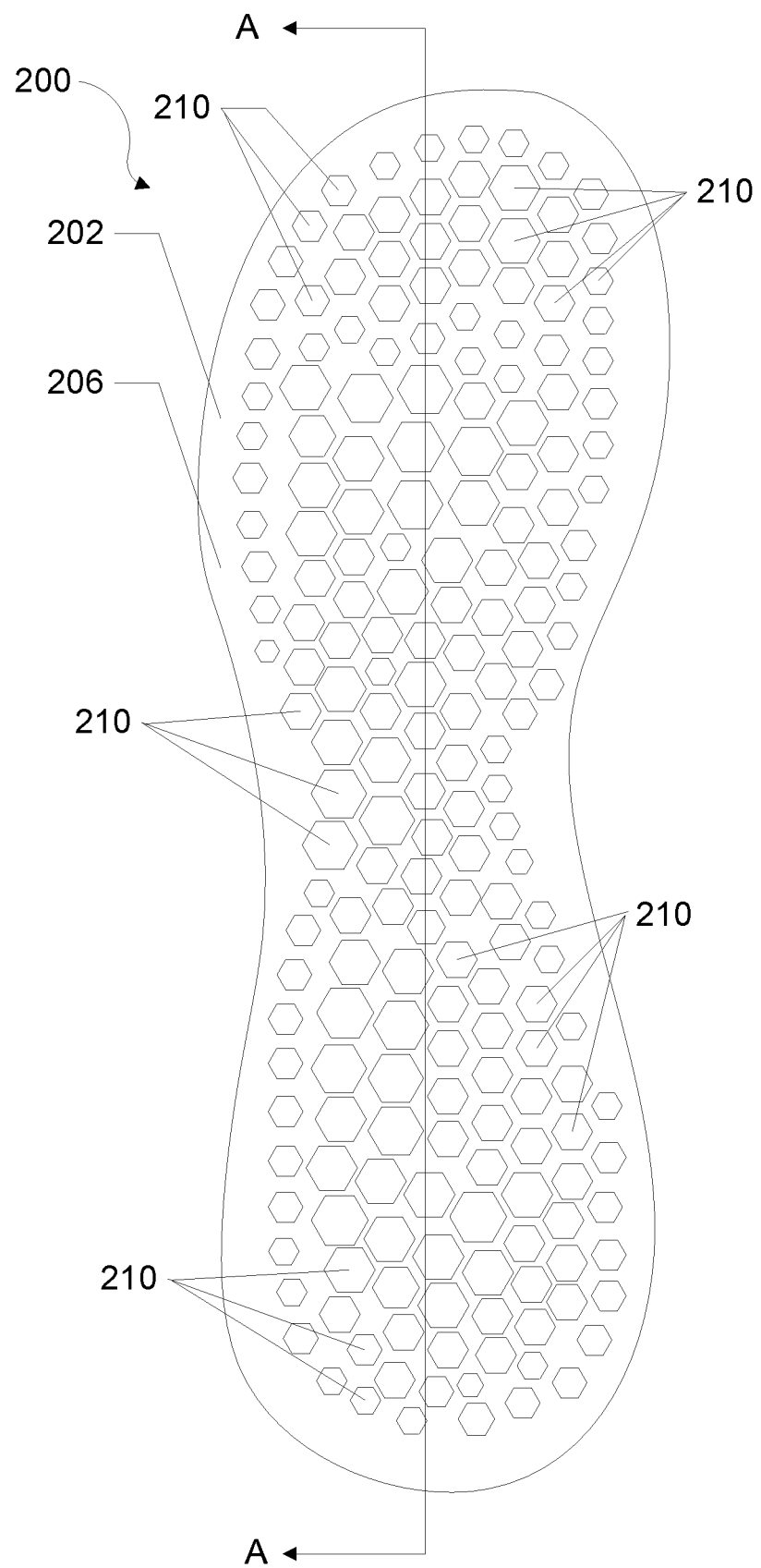
FIG. 3 is a top plan view of one example outsole of the article of footwear having a polygon lug pattern.

FIGS. 3 and 4 illustrate various aspects of one example embodiment of an outsole 200 having a polygon lug pattern in accordance with this invention. As shown in FIGS. 3 and 4, this example outsole 200 includes a periphery 202, and at least a portion of the outsole 200 includes a plurality of protrusions or lugs 210 protruding outward from a base surface of the outsole 200. The outsole 200 is generally connected to the midsole (not shown in FIGS. 3 and 4) such that a top surface 204 of the outsole 200 is in contact with the midsole and a base surface 206 of the outsole 200 is in contact with the ground or other external contact surface. In the example arrangement shown, the plurality of lugs 210 may be formed in the bottom surface 206 of the outsole 200 such that the plurality of lugs 210 are arranged to protrude downward from the base surface 206 to contact the ground or other surface during use. For example, the lugs 210 may be arranged so that a distal end 211 of each lug 210 contacts the ground or other surface during use.

FIG. 4 is a cross-sectional view of an outsole 200 like that shown in FIG. 3 taken along line A-A. The top surface 204 of the outsole 200 may be generally flat and may be connected to the midsole of the article of footwear. For instance, the outsole 200 may be connected to the midsole or other portion of the footwear structure by stitching, bonding, adhesive or any other generally known method of attachment. The base surface 206 of the outsole 200 may be generally flat and, when the article of footwear is placed on a contact surface, may be substantially parallel to the contact surface. In some arrangements, the outsole 200 may include a slight upward curve 208 or other structure, toward the midsole, e.g., to aid in attachment and provide a more pleasing appearance. The outsole 200 and/or midsole surfaces may take on any desired shapes and/or constructions, including shapes and/or constructions that are generally known or used in the art.

With further reference to FIG. 4, the outsole 200 includes a plurality of protrusions or lugs 210 formed therein. The lugs 210 in this example structure 200 are generally uniform in shape and may have a polygonal cross-section. As shown, the plurality of lugs 210 protrude generally perpendicularly outward from the base surface 206 of the outsole 200. For instance, the lugs 210 generally protrude downward with the proximal end 213 of each lug 210 extending from or connected to the base surface 206 of the outsole 200 and with the distal end 211 of each lug 210 forming a portion of a ground contacting surface. In the arrangement shown, the outsole 200 may be connected at a bottom portion of the midsole such that the lugs 210 may protrude downward to a point at which the distal end 211 of the lug 210 remains past the bottom surface of the midsole. The height (H in FIG. 5) of each of the lugs 210 may be generally uniform across the surface of the outsole 200, if desired, to provide an even ground contacting surface. In one arrangement, the plurality of lugs 210 may be a height suitable to allow for cushioning and traction for the wearer and may also provide ample flexibility when the outsole 200 flexes. For instance, in one example arrangement, the plurality of lugs 210 may be between 1 mm and 50 mm, and in some examples between 3 mm and 35 mm or even between 5 mm and 30 mm in height. This depth to the base surface 206 may provide traction to the user and may also allow for flexibility of the outsole 200 during use because the outsole can flex between the lugs 210.

Although in some arrangements the lugs 210 may be uniform in height, other size and construction characteristics of the lugs 210 may vary. For instance, the lugs 210 may vary in width or wall thickness. In some arrangements, the configuration of the lugs 210 may also vary. The lugs 210 also may vary in height over the area of the shoe sole (e.g., as shown in FIGS. 1 and 2), to provide a comfortable surface for walking, running, jumping, or other activities.

Generally, the lugs 210 may vary in width (W in FIG. 5) from approximately 1 mm to 40 mm, and in some examples between 3 mm and 30 mm or even between 5 mm and 25 mm. In some arrangements discussed below, the size of each of the lugs 210 may depend on the position of the lug 210 on the outsole 200. For instance, some larger lugs, such as lug 210a in FIG. 4, (e.g., those having a relatively wider width) may be positioned in regions of the outsole 200 where additional support is needed (i.e., areas where the foot strikes the ground with greater force). However, smaller lugs, such as lug 210b in FIG. 4, (e.g., those having a relatively narrower width) may be positioned in regions where ground contact is minimized and/or the contact force is somewhat less.

The lugs 210 may also vary in wall thickness (T in FIG. 5). For instance, in some arrangements, at least a portion of the lugs 210, or even the entire lug 210, may be solid structures. Additionally or alternatively, the lugs 210 may be formed as hollow structures. The hollow construction may aid in flexibility of each of the lugs 210 of the outsole 200. In arrangements utilizing the hollow construction, the wall thickness (T in FIG. 5) may vary, e.g., depending on the position of the lug 210 on the outsole 200, the size of the lug 210, the expected impact force on the lug 210, or the like. For instance, in areas where additional support may be needed, the lugs 210 may be of a heartier construction which includes a wall thickness between 1 mm and 20 mm, and in some examples between 3 mm and 15 mm or even between 4 mm and 12 mm. In areas where less support may be needed, the lugs 210 may be formed with thinner walls to aid in flexibility of the lugs 210 and to reduce weight. Not all walls of a lug 210 need to have the same thickness (although they may have the same thicknesses).

Figure 6A:
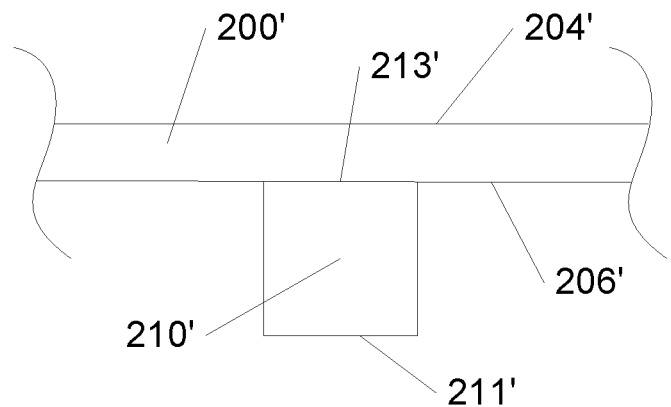
FIGS. 6A-6C are cross-sectional views taken along a vertical plane of example lugs illustrating various configurations.

With reference to FIGS. 4 and 6A-6C, different embodiments of a polygon lug sole may include various lug configurations. In one example arrangement shown in FIG. 4, the lugs 210 may vary in size but may have a generally uniform cross-sectional area. For instance, each individual lug may have a generally constant width from the proximal end 213 to the distal end 211. A close-up view of one example lug according to this arrangement is shown in FIG. 6A. A portion of the outsole 200' is shown having a top surface 204' to be connected to the midsole and a base surface 206' from which the lug 210' protrudes or extends generally perpendicular to the surface. The lug 210' is shown having a constant width and wall thickness from the proximal end 213' to the distal end 211'.

Figure 6B:
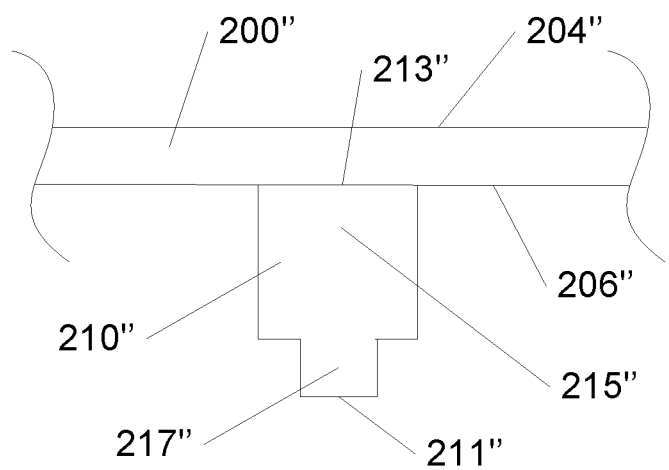

FIG. 6B is a close-up view of an alternate arrangement of another example lug 210". In the arrangement of FIG. 6B, a portion of the outsole 200" is shown with the lug 210" protruding or extending downward, generally perpendicular to the base surface 206" of the outsole 200". The lug 210" includes a stepped configuration wherein a base portion 215" is formed at the proximal end 213" of the lug 210". The lug 210" may have a different cross-sectional area at the base portion 215" than at the distal end 211" of the lug 210". For example, the base portion 215" of the lug 210" may be wider than the distal portion 217". The distal portion 217" may be somewhat narrower than the base portion 215". In one example arrangement, the base portion 215" may extend from the bottom surface 206" of the outsole to a point about halfway to the distal end 211" of the lug 210". In yet another arrangement, the base portion 215" of the lug 210" may extend from the bottom surface 206" of the outsole 200" to a point more than halfway to the distal end 211" of the lug 210". Although this arrangement may include a change in the cross-sectional area of the lug 210", the shape of the lug 210" still may be uniform from the proximal end 213" of the lug 210" to the distal end 211". For example, the base portion 215" and the distal portion 217" may be the same polygonal shape. This stepped configuration may provide additional flexibility to the lug and may reduce weight associated with the outsole. If desired, the different size for the distal portion 217" may be provided by adding a traction element to the bottom of the base portion 215".

Figure 6C:
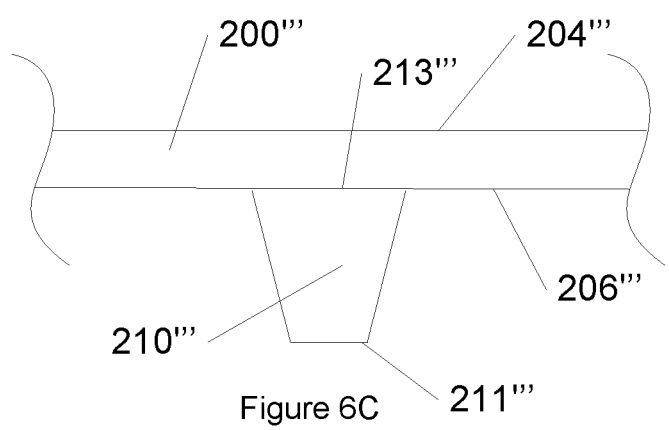

FIG. 6C illustrates a close-up view of yet another example configuration of a lug 210'". The outsole 200'" is shown with the lug 210'" protruding or extending downward, generally perpendicular to the base surface 206'" of the outsole 200'". The lug 210'" includes a tapered configuration wherein the proximal end 213'" of the lug 210'" is wider than the distal end 211'". Thus the cross-sectional area of the lug 210'" narrows from the proximal end 213'" to the distal end 211'". This tapered configuration may provide additional stability to the lug 210'" and may reduce weight associated with the outsole.

Figure 8:
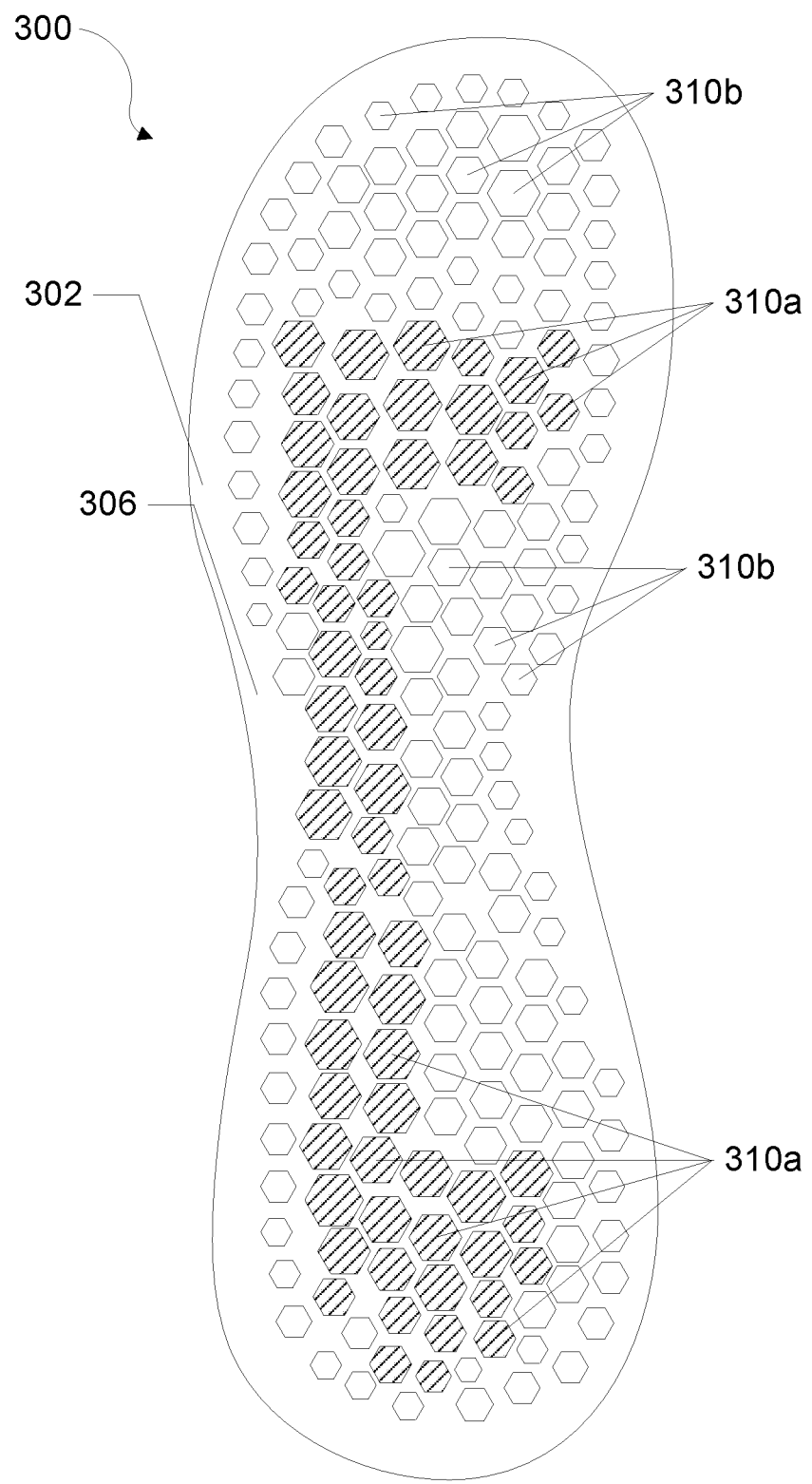
FIG. 8 is a top plan view of another example outsole of the article of footwear.
Figure 9:
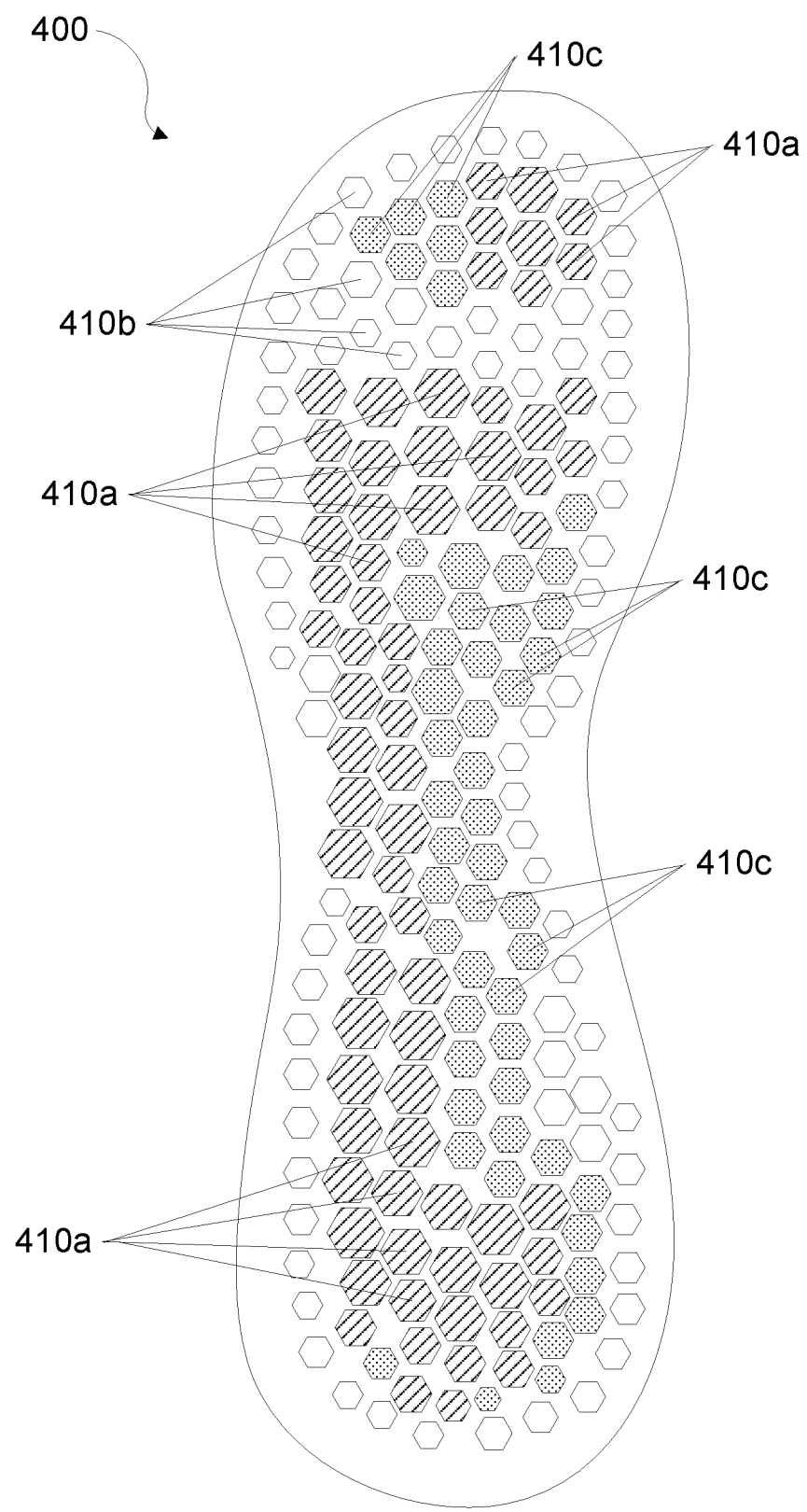
FIG. 9 is a top plan view of yet another example outsole of the article of footwear.

Generally, embodiments of the polygonal lug sole pattern include lugs that are generally uniform in shape. For example, each lug may be constructed to have a shape substantially similar to the other lugs in the outsole, as shown in FIGS. 3, 8 and 9. In one arrangement, the lugs may be identical in size and shape. In another arrangement, the lugs may be substantially similar in shape and may differ only in size or other performance characteristics. For example, the lugs may all be the same shape polygon (i.e., triangular, hexagonal, pentagonal, etc.) but may differ in height, width, wall thickness or another size based characteristic, as discussed above.

Figure 7A:
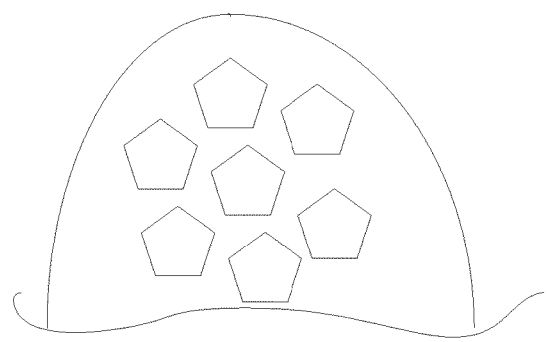
FIGS. 7A-7D illustrate portions of outsoles having various alternate cross-sectional configurations for example lugs of the outsole of the article of footwear.
Figure 7B:
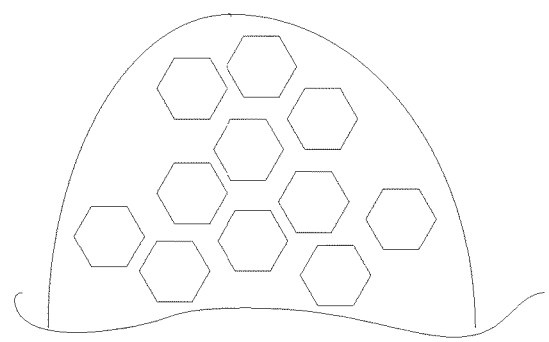
Figure 7C:
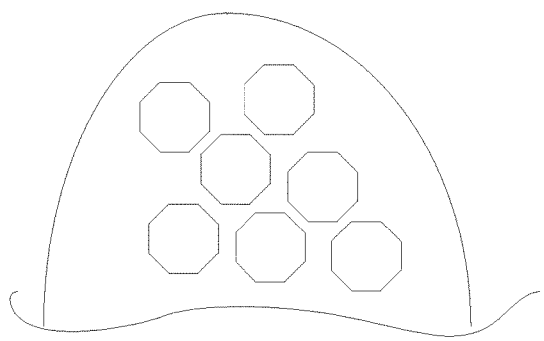
Figure 7D:
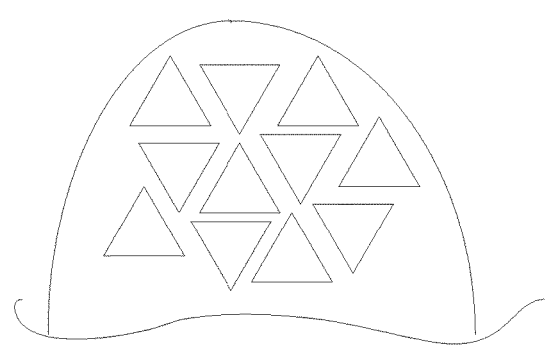

Further examples of the polygon lug sole pattern in accordance with the invention are shown in FIGS. 8 and 9. In the embodiments shown, the polygonal lugs have a hexagonal cross section. The hexagonal shape may allow the lugs to be closely nested together in certain regions of the outsole. In addition, hexagonal lugs of various sizes and performance characteristics may be used in different regions of the outsole. Examples of the arrangements of the lugs will be discussed more fully below. Although hexagonal lugs will be used throughout this specification as one example embodiment of the polygonal lug sole structure, the hexagonal shape is one example. The lugs may be constructed in various shapes. Some examples of alternate shapes are shown in the portions of outsoles shown in FIGS. 7A-7D. For example, the lugs may have a pentagonal cross section, as shown in FIG. 7A, an octagonal cross section, as shown in FIG. 7C, a triangular cross section, as shown in FIG. 7D, and the like.

FIGS. 8 and 9 illustrate alternate example embodiments of a polygon lug sole structure having hexagonal polygons. FIG. 8 illustrates an outsole 300 having one example arrangement. The outsole 300 includes a substantially flat top surface (not shown) and a substantially flat base surface 306. A plurality of lugs 310 protrudes or extends downward, generally perpendicular to the base surface 306. As shown in FIG. 8, the lugs 310 are arranged to cover at least a portion of the outsole 300 (i.e., at least 50%). In one arrangement, the lugs 310 are arranged to cover substantially most of the base surface 306 of the outsole 300 (i.e., at least 70% or at least 80%). An outer edge or perimeter 302 is shown on which no lugs are formed. This area 302 may be flat or may include a slight upward curve for ease of attachment of the outsole 300 to the midsole or to provide a more pleasing appearance for the outsole 300.

The outsoles shown in FIGS. 8 and 9 may include one or more regions. Each region may include lugs having performance characteristics suitable for that region and, in some arrangements, different from other regions. In general, the motion of the foot during running proceeds as follows: Initially, the heel strikes the ground, followed by the ball of the foot. As the heel leaves the ground, the foot rolls forward so that the toes make contact, and finally the entire foot leaves the ground to begin another cycle (with this portion of the step, the toes can receive a substantial amount of force). In order to accommodate the various forces incident on the foot (i.e., heel hitting the ground, foot flexing, etc.), the characteristics of the lugs may vary depending on the position of the lug on the outsole. For instance, in areas of high contact force or pressure, such as the heel area or the ball of the foot where the foot strikes the ground with a high degree of force, the lugs may be larger or may have thicker walls to accommodate the forces incident on these regions. Additionally or alternatively, the lugs in the high pressure areas may be more closely packed. Other areas of the outsole could be considered low pressure areas. These areas may include the arch of the foot, some areas along the lateral side of the outsole connected to the heel area or the toe area and/or generally around the perimeter of the foot. The lugs in these low pressure areas may be smaller or may be made with somewhat thinner walls. Additionally or alternatively, the lugs in the low pressure areas may be less closely packed that the lugs in the high pressure areas.

FIG. 8 illustrates one polygon lug sole arrangement wherein the outsole 300 includes more than one region and wherein characteristics of the lugs 310 within a region vary depending on the location or position of the region. The lugs 310 of FIG. 8 are sectioned into at least two regions, a high pressure or force bearing region, identified by lugs 310a shown with cross-hatch, and a low pressure or force bearing region, identified by lugs 310b without cross-hatch. The high pressure or force bearing region of FIG. 8 generally includes a portion of the central region of the outsole 300. The low pressure or force bearing region of FIG. 8 includes the lugs 310b around the central portion or at a periphery of the central portion. The lugs 310a in the high pressure or force bearing region may include some that are larger in size (i.e., have a greater width) than others within that region and/or than others in the low pressure region. Additionally or alternatively, at least a portion of the lugs 310a within this high pressure region may be constructed having a greater wall thickness than other lugs in the outsole. The increased size and/or wall thickness may provide a heartier lug having increased stability and impact attenuation properties in these areas where the foot strikes the ground with a high degree of force.

The lugs 310b in the low pressure or force bearing region (shown without cross-hatch) may have physical and performance characteristics that differ from the lugs 310a of the high pressure or force bearing region. For instance, at least a portion of the lugs 310b in the low pressure or force bearing region may be smaller in size than at least a portion of the lugs 310a in the high pressure or force bearing region. In addition, at least a portion of the lugs 310b of the low pressure region may have a wall thickness somewhat less than the wall thickness of at least a portion of the lugs 310a in the high pressure or force bearing region. The construction of the lugs 310b in the low pressure or force bearing region may provide increased flexibility of the outsole 300 and may reduce weight associated with the outsole.

In addition to potential differences in construction of the lugs in the different regions, the positioning or spacing of the lugs relative to each other may also differ based on the region. For instance, at least a portion of the lugs 310a in the high pressure or force bearing region may be closely packed. In one example, the distance between neighboring lugs 310a in the high pressure or force bearing region may be between 1 mm and 15 mm, or even 1 mm and 8 mm. Arranging the lugs 310a in the high pressure region in a tightly packed configuration may increase stability and cushioning in that portion of the outsole 300.

Additionally or alternatively, at least a portion of the lugs 310b of the low pressure or force bearing region may be placed further apart than at least a portion of those in the high pressure or force bearing region. For instance, the spacing in the low pressure or force bearing region between neighboring lugs 310b may be between 1.5 mm and 20 mm, or even between 2 mm and 12 mm. Providing increased spacing between the lugs 310b of the low pressure or force bearing region may provide increased flexibility in that region of the outsole 300. For example, as the outsole 300 flexes during use, the increased spacing between the lugs 310b around the periphery of the outsole may aid in permitting the outsole 300 to bend more freely between the lugs 310b.

Although the spacing of the lugs may differ depending on the position of the lug on the outsole or the region, in the arrangements shown, the lugs are generally not in direct contact with each other. For instance, when the outsole is in a non-flexed position (i.e., resting flat on a contact surface) neighboring lugs will have at least a minimal gap between them. The spacing between the lugs may permit the outsole to bend more freely and conform to foot flexation during movement.

The example spacing and sizing arrangement shown in FIG. 8 may also aid in attenuating the impact forces of the foot striking the ground by spreading the load across the surface of the foot. For instance, the larger or thicker walled lugs may provide additional support in high pressure or force bearing areas, while the smaller or thinner walled lugs may provide less support but may aid in flexibility. This arrangement allows for increased load support in high pressure or force bearing areas to provide an even impact-attenuating and traction arrangement for the outsole.

FIG. 9 illustrates an alternate arrangement of an outsole 400 having polygonal lugs 410 with different physical and performance characteristics based on the position of the lug 410 on the outsole 400. The outsole 400 of FIG. 9 includes multiple regions with lugs 410 having varying characteristics. For instance, the outsole may include a high pressure or force bearing region (having lugs 410a shown in cross-hatch). The high pressure or force bearing region may include the heel area as well as a lateral side of the foot in a central area, i.e., opposite the arch of the foot. In addition, the outsole 400 may include a high pressure or force bearing area in the toe region (i.e., beneath the first toe of the wearer). These areas may generally receive the majority of the high pressure forces exerted on the foot during use. In addition, the outsole 400 may include a low pressure or force bearing region (having lugs 410b shown without cross-hatch). The low pressure or force bearing region may include the periphery of the outsole 400 and the area just above the ball of the foot. These regions may receive the lowest degree of force exerted on the foot during use. The outsole 400 of FIG. 9 also includes a third region (having lugs 410c shown with stippling). The third region may include the central area of the foot (i.e., adjacent the arch) and may also include the region beneath the second through fifth toes of the user. The third region may receive a moderate degree of force during use. For example, the third region may receive less force than the high pressure or force bearing region but more force than the low pressure or force bearing region.

The lugs 410a, 410b of the high and low pressure or force bearing regions in FIG. 9 may be substantially similar in construction and physical characteristics to those of similar regions in FIG. 8. The characteristics of the lugs 410c of the third region may differ from those of the lugs 410a, 410b in the high pressure and low pressure or force bearing regions. For instance, at least a portion of the lugs 410c of the third region may be sized between at least a portion of those in the high pressure or force bearing region and those in the low pressure or force bearing region. In addition, the lugs 410c of the third region may have a wall thickness between at least a portion of those in the high pressure or force bearing region and those in the low pressure or force bearing region. Still further, the lugs 410c of the third region may be spaced more closely than those of the low pressure or force bearing region but not as tightly as those of the high pressure or force bearing region.

It should be noted that a portion of the lugs 410 may also include characteristics that are a combination of the characteristics of lugs in different regions. In one arrangement, at least a portion of the lugs may be constructed having a stepped configuration, as shown in FIG. 6B. This configuration allows the distal portion to have characteristics that differ from those of the base portion. For example, the base portion may have characteristics similar to those of the lugs 410c in the third region of FIG. 9, i.e., medium sized with wall thickness between that of lugs 410a, 410b in the high and low pressure or force bearing regions. However, the distal portion may have some characteristics similar to those of the high pressure or force bearing region, i.e., increased wall thickness. This composite type arrangement may allow for increased flexibility, stability and impact-attenuation in certain lugs.

Although FIGS. 8 and 9 indicate distinct regions for the lugs, it should be noted that lugs of a certain size or structure are not limited to use within a single region. Rather, lugs of varying sizes may be used in all regions to more fully distribute the load across the foot. In addition, although outsoles illustrating two and three regions are shown, other embodiments may be considered having more than three different regions with lugs having still other characteristics.

Of course, a wide variety of specific footwear structures may take advantage of the various features described above without departing from this invention.

The outsole may be formed of any suitable material that may provide traction for the user, as well as at least a minimal level of impact-attenuation and/or flexibility. For instance, the outsole may be formed of rubber or a synthetic material having the desired properties, such as polyurethane and/or other suitable materials as are known and used in the art. The outsole may be constructed using any of several known methods including methods that are known and/or used in the art. Additionally or alternatively, the outsole may be formed using a cast polyurethane process. The cast polyurethane process may include forming a mold having the desired outsole shape. For instance, the mold may include the substantially flat upper surface as well as polygonal portions for forming the lugs of the outsole. The outsole may then be filled with polyurethane. The excess polyurethane may be removed, e.g., by scraping or squeegeeing it off the top of the mold. Once the excess polyurethane is removed, a second material (e.g., textile or leather forming the upper or the midsole) may be added to the mold. At this point, heat and pressure may be applied to the form the final molded product. Cast polyurethane molding processes are conventional and known to those skilled in the art.

III. Conclusion

The invention is disclosed above and in the accompanying drawings with reference to a variety of embodiments. The purpose served by the disclosure, however, is to provide an example of the various features and concepts related to aspects of the invention, not to limit the scope of aspects of the invention. One skilled in the relevant art will recognize that numerous variations and modifications may be made to the embodiments described above without departing from the scope of the invention, as defined by the appended claims.

The invention claimed is:

1. A sole structure for an article of footwear, comprising:
   a base surface; and
   a first plurality of polygonal lugs extending from the base surface, the first plurality of polygonal lugs having a first plurality of free ends opposite the base surface are not in contact with each other and wherein the free ends have distal surfaces that are arranged to form a ground contacting surface of the sole structure, wherein the first plurality of polygonal lugs includes a first polygonal lug having two adjacent sides nested within an area defined by sides of a first pair of adjacent polygonal lugs, wherein the first plurality of polygonal lugs is arranged in a first region of the sole structure; and a second plurality of polygonal lugs extending from the base surface, the second plurality of polygonal lugs being arranged to form the ground contacting surface of the sole structure, wherein the second plurality of polygonal lugs includes a second polygonal lug having two adjacent sides nested within an area defined by sides of a second pair of adjacent polygonal lugs, wherein the second plurality of polygonal lugs is arranged in a second region of the sole structure different from the first region of the sole structure; and wherein each lug of the first plurality of polygonal lugs has a hollow construction with a hollow portion enclosed by each distal surface;

wherein the first plurality of polygonal lugs and the second plurality of polygonal lugs are non-uniformly sized.

2. The article of footwear of claim 1, wherein the first plurality of polygonal lugs in the first region have a first spacing arrangement; and wherein the second plurality of lugs in the second region have a second spacing arrangement different from the first spacing arrangement.

3. The sole structure of claim 2, wherein the first plurality of polygonal lugs have a first wall thickness and the second plurality of polygonal lugs have a hollow construction and a second wall thickness different from the first wall thickness.

4. The sole structure of claim 3, wherein the first wall thickness is between 3 mm and 20 millimeters.

5. The article of footwear of claim 3, wherein the second wall thickness is between 1 mm and 5 millimeters.

6. The sole structure of claim 3, wherein the first region is arranged at a central portion of the ground contacting surface and the second region is arranged at a periphery of the central portion.

7. A sole structure for an article of footwear, comprising:
a base surface;
a first plurality of polygonal lugs extending from the base surface, the first plurality of polygonal lugs having a first plurality of free ends opposite the base surface are not in contact with each other and wherein the free ends have distal surfaces that are arranged to form a ground contacting surface of the sole structure, wherein the first plurality of polygonal lugs includes a first polygonal lug having two adjacent sides nested within an area defined by sides of a first pair of adjacent polygonal lugs, wherein the first plurality of polygonal lugs is arranged in a first region of the sole structure;

a second plurality of polygonal lugs extending from the base surface, the second plurality of polygonal lugs being arranged to form the ground contacting surface of the sole structure, wherein the second plurality of polygonal lugs includes a second polygonal lug having two adjacent sides nested within an area defined by sides of a second pair of adjacent polygonal lugs, wherein the second plurality of polygonal lugs is arranged in a second region of the sole structure different from the first region of the sole structure; and a third plurality of polygonal lugs extending from the base surface, the third plurality of polygonal lugs being arranged to form the ground contacting surface of the sole structure, wherein the third plurality of polygonal lugs includes a second polygonal lug having two adjacent sides nested within an area defined by sides of a second pair of adjacent polygonal lugs, wherein the third plurality of polygonal lugs is arranged in a third region of the sole structure different from both the first region and the second region of the sole structure; and wherein the first plurality of polygonal lugs has a first lug characteristic, and the second plurality of polygonal lugs has a second lug characteristic different than the first lug characteristic, and the third plurality of polygonal lugs has a third lug characteristic different than both the first lug characteristic and the second lug characteristic; and wherein each lug of the first plurality of polygonal lugs has a hollow construction with a hollow portion enclosed by each distal surface.

8. The sole structure of claim 7, wherein the first plurality of polygonal lugs have a first wall thickness, the second plurality of polygonal lugs have a hollow construction and a second wall thickness, and the third plurality of polygonal lugs have a hollow construction and a third wall thickness, wherein the first wall thickness is different than the second wall thickness.

* * * * *